(12) United States Patent
Hennessy (10) Patent No.: US 7,987,454 B2
(45) Date of Patent: Jul. 26, 2011

(54) SYSTEM AND METHOD FOR EMULATING THE PROCESSING OF JAVA SERVER PAGES

(75) Inventor: James P. Hennessy, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 1587 days.

(21) Appl. No.: 11/314,867

(22) Filed: Dec. 20, 2005

(65) Prior Publication Data

US 2007/0143748 A1 Jun. 21, 2007

(51) Int. Cl.
*G06F 9/45* (2006.01)
(52) U.S. Cl. ........................ 717/134; 717/135
(58) Field of Classification Search .................. 717/134, 717/135
See application file for complete search history.

(56) References Cited

U.S. PATENT DOCUMENTS

| 6,507,867 | B1 * | 1/2003 | Holland et al. | 709/219 |
|---|---|---|---|---|
| 6,622,168 | B1 * | 9/2003 | Datta | 709/219 |
| 6,697,849 | B1 * | 2/2004 | Carlson | 709/219 |
| 6,715,129 | B1 * | 3/2004 | Hind et al. | 715/239 |
| 7,448,024 | B2 * | 11/2008 | Breeden et al. | 717/125 |
| 7,487,440 | B2 * | 2/2009 | Gergic et al. | 715/234 |
| 7,873,908 | B1 * | 1/2011 | Varanasi et al. | 715/763 |
| 2002/0046240 | A1 * | 4/2002 | Graham et al. | 709/203 |
| 2003/0226107 | A1 * | 12/2003 | Pelegri-Llopart et al. | 715/513 |
| 2005/0240558 | A1 * | 10/2005 | Gil et al. | 707/1 |
| 2006/0075385 | A1 * | 4/2006 | Backhouse | 717/115 |

OTHER PUBLICATIONS

Kurbel, K. and Dabkowski, A. Dynamic WAP Content Generation with the use of Java Server Pages. Web Database: Java and Databases: Persistence Options. 2002. Erfurt, Germany.*

Information Disclosure Statement from China IP Law department, Mar. 7, 2008.
Mark Roth and Eduardo Pelegri-Llopart. "JavaServer Pages ™ Specification", Version 2.0. Sun Microsystems, Santa Clara, CA., Nov. 24, 2003. pp. iii-vi,1-3 to 1-8, 1-64 to 1-84, 1-85, 1-158 to 1-172, 1-173 to 1-175.
"JavaServer Pages Standard Tag Library", Sun Microsystems. 2 pages. [ Downloaded Dec. 1, 2005 from http://java.sun.com/products/jsp/jstl/index.jsp.].
"JSR 152: JavaServer Pages ™ 2.0 Specification", Sun Microsystems. [ Downloaded Dec. 1, 2005 from http://jcp.org/en/jsr/detail?id=152.] 7 pages.

(Continued)

*Primary Examiner* — Wei Y Zhen
*Assistant Examiner* — Matthew J Brophy
(74) *Attorney, Agent, or Firm* — Dennis Jung, Esq.; Blanche E. Schiller, Esq.; Heslin Rothenberg Farley & Mesiti P.C.

(57) ABSTRACT

The processing of server pages is emulated at run time. The system includes a library of custom tags, and a server page emulator for reading the server page, including identifying any calls to the library of custom tags, and further for emulating any calls to the custom tags identified in the server page; and thereby generating and processing the server pages dynamically at runtime. Each server page is parsed to create a tree of nodes for each element of the page, and each node identified as one of template text, custom tag start, custom tag end, and expression language (EL) expression. For each template text node, text is written directly to final markup. For each custom tag node, a return code indicates that the body should be skipped, processed normally, or provided as bulk data to the tag implementation. For each EL expression node, the EL expression is evaluated and the result written to final markup.

16 Claims, 8 Drawing Sheets

OTHER PUBLICATIONS

"Java Servlet Technology", Sun Microsystems. [Downloaded Jul. 7, 2005 from http://java.sun.com/products/servlet/index.jsp.] 2 pages.

"JavaServer Pages Technology", Sun Microsystems. [Downloaded Jul. 7, 2005 from http://java.sun.com/products/jsp/index.jsp.] 2 pages.

"Expression Language", Sun Microsystems. [Downloaded Nov. 12, 2005 from http://java.sun.com/j2ee/1.4/docs/tutorial/doc/JSPIntro7.html.] 6 pages.

Al- Darwish, Nasir, "PageGen: An Effective Scheme for Dynamic Generation of Web Pages", Jul. 15, 2003, Information and Software Technology, vol. 45, Issue 10, pp. 651-662.

Zdun, et al, "Dynamically Generating Web Application Fragments from Page Templates", ACM Digital Library, 2002, pp. 1113-1120.

Christensen et al, "Extending Java for High-Level Web Service Construction", Nov. 2003, ACM Transactions on Programming Languages and Systems, vol. 25, No. 6, pp. 814-823.

Sarkar, Ronnie, "A Proxy-Based Tool to Enable Remote Tracing ("Software Sniffing") Flow Capture and Replay, and Testing Via Host Interaction Simulation, of Screen Scraping Applications, in a Host Publishing Environment", Jan. 2000, IBM Research Disclosure 429130, pp. 166-167.

Hansen et al., "Performance Comparison of Dynamic Web Platforms", Jul. 15-19, 2001, International Symposium on Performance Evaluation of Computer and Telecommunication Systems, Orlando, FL., pp. 590-598.

* cited by examiner

SYSTEM AND METHOD FOR EMULATING THE PROCESSING OF JAVA SERVER PAGES

BACKGROUND OF THE INVENTION

1. Technical Field of the Invention

This invention relates to computer programming. More particularly, it relates to creation of dynamic web applications using the Java programming language.

2. Background Art

The art is familiar with ways to create a web application whose pages are extremely dynamic or numerous. Dynamic web pages are not new. For years people wrote adequate web applications by using the "Common Gateway Interface" (CGI) from C programs. More recently, many programmers use the Java programming language and the Java Servlet technology to create a dynamic web page. A related technology that allows for a better separation between code and presentation is the Java Server Pages technology.

A Java Server page is a textual document that describes how to create a response object from a request object for a given protocol. These are described in "JavaServer Pages™ Specification", Version 2.0, Chapter JSP.1. Sun Microsystems, Copyright 2003.

Heretofore, to write a dynamic web page to display the time of day, for example, a servlet program would be coded something like the following simplified example:

```
import java.io.*;
import java.util.Date;
import javax.servlet.*;
import javax.servlet.http.*;
public class DateServlet extends HttpServlet {
    public void doGet(HttpServletRequest req,
            HttpServletResponse resp) {
        PrintWriter out = resp.getWriter( );
        out.write("<html><body>The time is ");
        out.write(new Date( ).toString( ));
        out.write("</body></html>");
    }
}
```

For a simple web page, this suffices, but not for a more complicated web page, where the services of someone skilled in composing HTML and who also knows Java programming would be required.

The evolution of the servlet technology that makes it easier for non-programmers to create pages is the Java Server Pages (JSP) technology. The dynamic page above can be expressed as a JSP in the following way:

```
<html>
<body>
The time is <%= new Date( ).toString( ) %>
</body>
</html>
```

This syntax is far more convenient for someone skilled in HTML composition, but not in programming. It is just a different way to express the servlet syntax, however. It's important to realize that at runtime, this will get converted into a servlet as well by the JSP container. That is, when this JSP page is first requested by a browser, the JSP container will read the file shown above and produce servlet source code roughly equivalent to the servlet example shown originally. It will then invoke the Java compiler to convert that Java source code into Java object code. Then the new servlet will be loaded and invoked to process the request, much as if the dynamic page had originally been expressed in the servlet form.

The JSP example shown above seems easier to write, but suppose the amount of Java code was more extensive than in the example. For example, to show a lunch menu it may be necessary to write code to look up information in a database and format it in a table. In such a case, the JSP file becomes a hard-to-read mix of markup and Java code. A better approach would allow the user-interface experts to focus on the HTML markup, while Java programmers can concentrate on the programming logic, without either party having to worry about interfering with the part of the file owned by the other. To address this requirement, the concept of custom tags, and custom tag libraries that provide implementations of those tags, has been introduced. [See "JavaServer Pages™ Specification", Version 2.0, Chapter JSP.8. Sun Microsystems, Santa Clara, Calif. Copyright 2003.] Using such tags, to show a lunch menu, the page composer might create JSP markup like the following:

```
<html>
<body>
<p>Today's lunch menu is the following:</p>
<caf:lunchMenu view="standard"/>
<p>Vegetarians may choose from the following meat-free
alternatives:</p>
<caf:lunchMenu view="vegetarian"/>
</body>
</html>
```

In this example, the page composer uses "custom tags" to insert dynamic information. The programmer provides a Java library that implements these custom tags. Just as in the last JSP example, when this page is first requested by a browser, the JSP container reads in the JSP file and creates Java source code, which it then compiles into Java object code. Where the JSP refers to a custom tag, the produced Java code will make a call to a library routine provided by the programmer. In this way, the programmer and the user-interface expert can each focus on their specialties.

The JSP example that uses custom tags is sufficient for many web applications, but fails to adequately address the following.

1. Web Applications that have Many Thousands of Dynamic Pages.

As stated above, a JSP file must be compiled into a servlet before it can be accessed. In order to do this, the JSP container creates Java code to represent the servlet. It invents a Java class name to use for this Java code, compiles the source code into object code, loads the resulting Java class definition into memory, and proceeds to use the loaded code. There is quite a bit of memory overhead in this operation. There is certain class-definition information that accompanies every new Java class that puts a strain on memory resources. If a JSP page is referenced once in the lifetime of the web application, the class definition for that class will get loaded and remain in memory until the web application ends. This can be a problem if the web application is large enough. It stands to reason that many future web applications will large enough to encounter this problem.

2. Web Applications Whose JSP Pages are not Static.

In some environments, it is convenient to represent pages as JSP files, yet still give the programmer the ability to fine-tune the contents of the web page before it is displayed. For example, a certain task of the web application might desire to add or remove markup from the JSP using Java code before the page is shown. The straightforward approach to implementing this would be to write a new JSP file each time the task wishes to make an alteration to the page, but this approach would cause a new servlet class to be created and loaded for each variation of the JSP file, quickly using up memory.

3. Web Applications Whose Pages are not Stored as JSP Markup.

In order to provide support for "pervasive" devices such as cell phones and PDAs, many dynamic web pages are represented on the server in some sort of abstract XML. When a page is referenced, the XML is converted at runtime to the markup that is appropriate for the target device. It would be useful and convenient if existing custom tag libraries could be used by the conversion code. To do so, the conversion code would dynamically create JSP markup when the page is referenced. But if a traditional JSP container is used to process the JSP markup to convert it to the final form (HTML or some other markup language), a new servlet class will be created and loaded into memory. But again, this is impractical, as it would quickly consume memory resources. Also, the latency involved with generating and compiling the Java code is usually unacceptable.

SUMMARY OF THE INVENTION

In accordance with the invention, a method and a computer program product are provided for emulating the processing of server pages, comprising reading the server page, including identifying any calls to a library of custom tags; emulating any calls to custom tags identified in the server page; and thereby generating and processing the server pages dynamically at runtime.

Further in accordance with the invention, a system is provided for emulating at run time the processing of server pages, comprising a library of custom tags, and a server page emulator for reading the server page, including identifying any calls to the library of custom tags, and further for emulating any calls to the custom tags identified in the server page; and thereby generating and processing the server pages dynamically at runtime.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

The present invention extends the Java Server Pages (JSP) technology by allowing the Java Server Pages themselves to be generated and processed dynamically at runtime.

Figure 1:
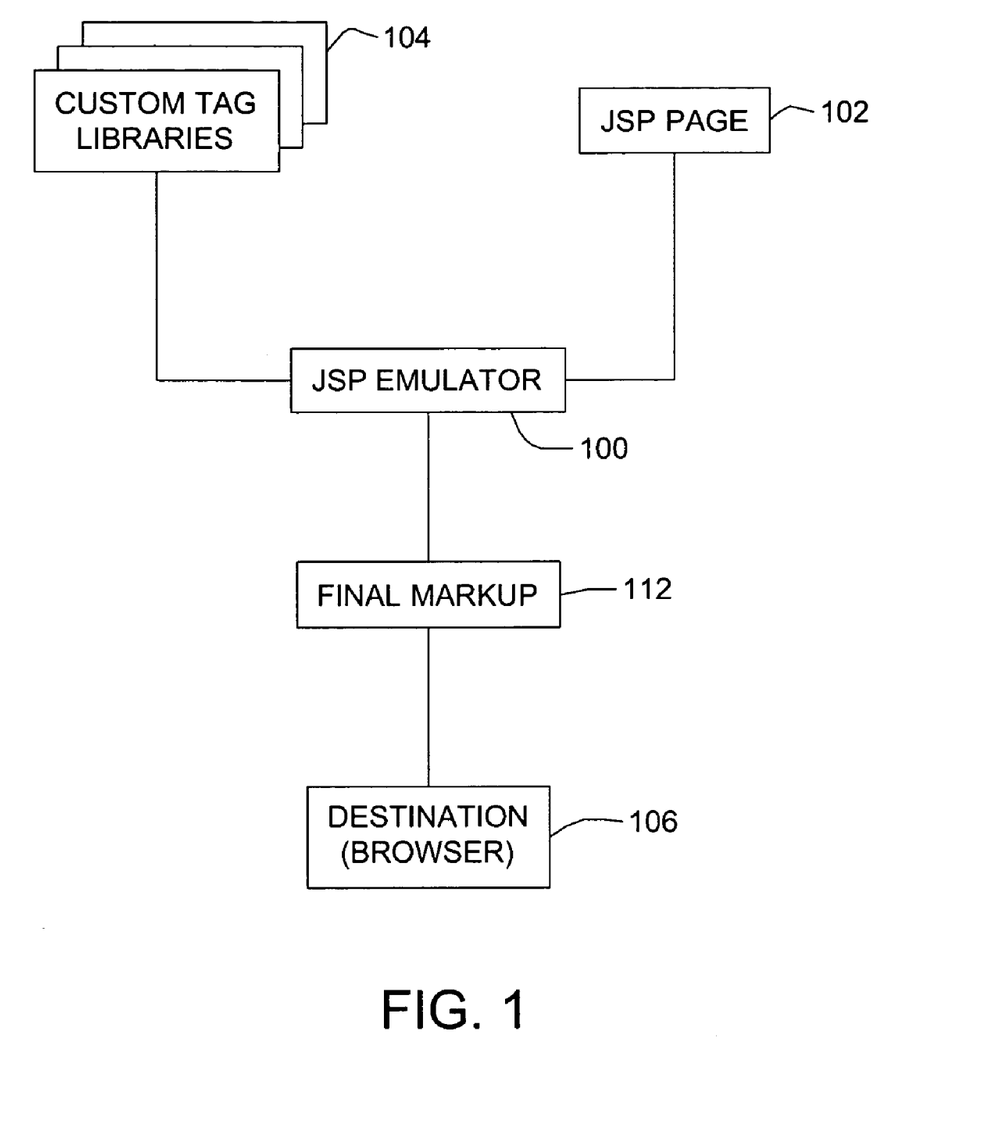
FIG. 1 is a high level system diagram showing the environment (inputs and outputs) of a Java Server Pages (JSP) Emulator in accordance with the preferred embodiment of the invention.
Figure 2:
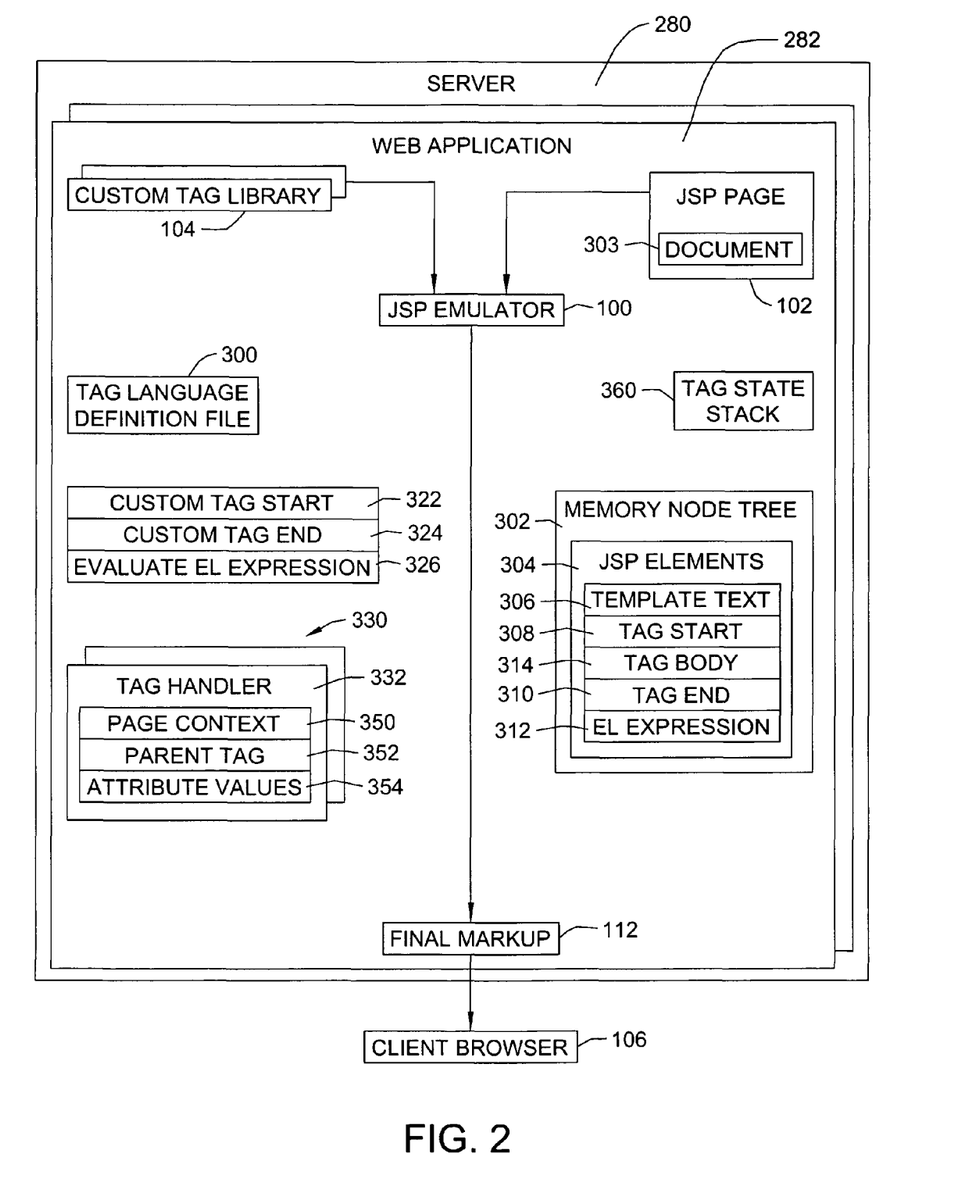
FIG. 2 is a diagrammatic representation of methods and structures of a preferred embodiment of the invention.

Referring to FIG. 1, the invention described here solves the problems listed above by creating another type of JSP container, or emulator, 100, one that doesn't compile JSP pages (which may be instantiated, for example, as JSP files on disk) 102 into servlets, but instead reads them and emulates any necessary calls 242, 249, 250, 251, 266, 272 (FIGS. 4B, 5A, and 5B) to custom tag libraries 104. This approach makes it impractical to include Java Scriptlets (embedded Java code) in the JSP page 102, but is very useful when custom tags 214, 218 (FIG. 3) are used, or "EL expressions" 222, introduced in the JSP 2.0 specification, which is often an acceptable substitute for embedded Java scriptlets. EL expressions are described in "JavaServer Pages™ Specification", Version 2.0, Chapter JSP.2. Sun Microsystems, Copyright 2003. Insofar as it is pertinent to the JSP emulator of the present invention, the EL expression is an expression syntax that is evaluated at run time. A function name that is used in an EL expression is mapped to a defining class and function signature in a Tag Language Definition (TLD) file 300 (FIG. 2).

The JSP container, or emulator, 100 can read a JSP page 102—which need not be a file on disk; it might reside only in memory having been created on the fly by a running task—and create an environment that makes it impossible for a custom tag implementation to distinguish JSP emulator 100 from a traditional JSP container.

As will be more fully described hereafter in connection with FIGS. 3, 4A, 4B, 5A, and 5C, as the emulator 100 parses (step 208) the JSP page 102, any text determined to be "template text" 210 is written 212 directly as the output stream, or final markup 112. When a custom tag 214, 218 is encountered in JSP page 102, emulator 100 issues calls 242, 249, 250, 251, 266, and/or 272 to the custom tag library implementation 104, providing implementations of all the same objects that custom tag library 104 would expect a traditional JSP container to provide. The most important object is an implementation of the output stream contained in pagecontext object 350 (created in step 206) that the custom tag code 104 uses to write dynamic content. The custom tag implementation proceeds as it normally would and produces the dynamic content. The final content, or markup 112, is produced by steps 212 and 224, and any output produced by the custom tag implementation in steps 242, 250, 266, and 272, and fed to some destination 106, such as a browser.

As implied above, a benefit of the present invention is that it saves memory over the traditional approach of compiling JSP pages 102 into servlets, and it allows the JSP page content 102 itself to be dynamically generated, which would be impractical using a traditional container. Even if the memory overhead were not an issue, in practice, the time it takes to emulate a JSP page 102 is a small fraction of the time it takes to convert it into a servlet and compile and load the new servlet, so if the application generates JSP pages 102 on the fly, the emulator 100 performs far better. With the proliferation of large, important, web applications 282 (FIG. 2), this is a valuable alternative to the traditional JSP container.

A traditional JSP container will generate Java source code representing a servlet, compile the Java source code into Java object code, load the new Java class definition, and then treat it like a servlet. However, in accordance with the present invention, JSP emulator 100 reads the JSP page 102, parses the content, and immediately processes it to produce output 112, including calling custom tag library 104 implementations. It is an advantage of the invention that a custom tag library 104 implementation can't detect the difference in calls from the JSP emulator 100 of the present invention, and a traditional JSP container.

The syntax for a JSP page 102 is described in the specification, "JavaServer Pages™ Specification", Version 2.0, Chapter JSP.1. Sun Microsystems, Copyright 2003. The cafeteria example previously given is one example of it. A page 102 may be created on the fly by a running task by having the running task write a file to disk, or the file contents may be put in memory for processing by the JSP emulator 100, even without writing to disk.

An environment which is impossible for a custom tag 104 implementation to distinguish from a traditional JSP container is created by step 206, and method arguments provided to the custom tag library 104 implementations in steps 224, 242, 249, 250, 251, 266, and 272.

Final markup, or output stream 112, is the place where output from JSP emulator 100 is written. It is typically sent ultimately to a browser 106. In final markup 112, there is no distinction between template text, expressions, or any other kind of input, for at this point they have all been processed into plain text, also known as markup. As used herein, template text is any text that isn't a custom tag library reference or an EL expression. Custom tag library 104 code is Java code, created using a Java API. For example:

JSPWriter writer=pageConext.getOUt( );

writer.write("This is dynamic output");

Referring to FIG. 2, certain programming structures and methods of the preferred embodiment of the invention are set forth. These will be referred to in connection with the following description of the flow charts of FIGS. 3, 4A, 4B, 5A, and 5B.

Figure 3:
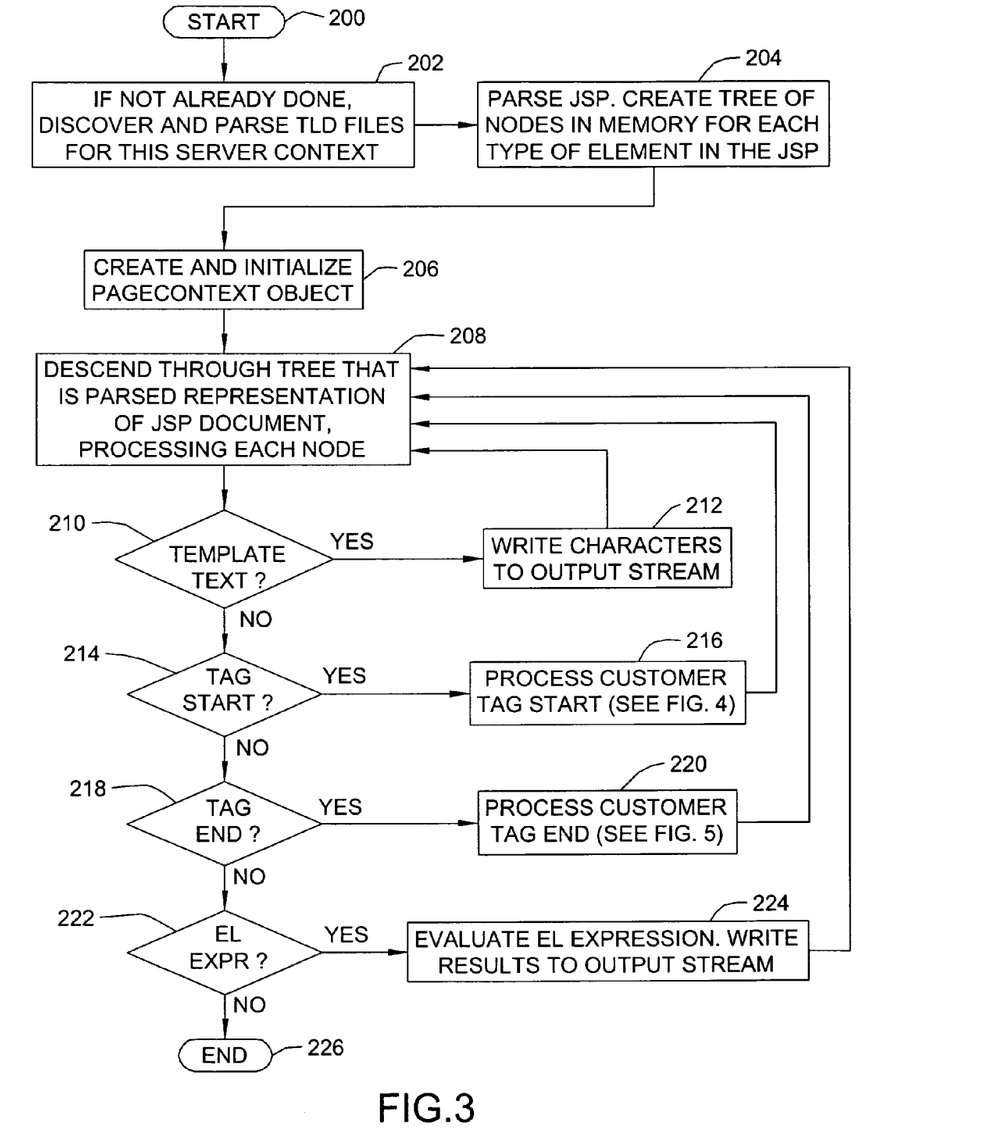
FIG. 3 is a flow chart representation of the preferred embodiment of the invention.

Referring to FIG. 3 in connection with FIG. 2, the process executed by JSP emulator 100 begins in step 200. In step 202, if not already done, JSP emulator 100 discovers and parses Tag Language Definition (TLD) files 300 for this server 280 context. "Server context" refers to a particular web application 282. A web server 280 might host several web applications 282, and each one might use a different set of custom tag libraries 104. A TLD file 300 is a file that contains information about the names of the custom tags 104, and names of the legal tag attributes, information about which attributes are required or can accept values that are expressions, and the name of a Java class that implements custom tag processing.

In step 204, JSP emulator 100 parses JSP page 102 and creates memory node tree 302 with each node being a JSP element 304 and a node provided for each type of element in JSP page 102. Tree 302 is thus a parsed representation of a document 303 in JSP page 102. A JSP page 102 contains markup, expressions, and references to custom tags, and TLD 300 contains information about the legal tags.

In step 206, JSP emulator 100 creates and initializes a PageContext object 350. In step 208, JSP emulator 100 descends through tree 302, processing each node, or element, 304.

If this JSP element, or node, 304 is a template text 210, in step 212 the text characters are written to output stream 112.

Figure 4A:
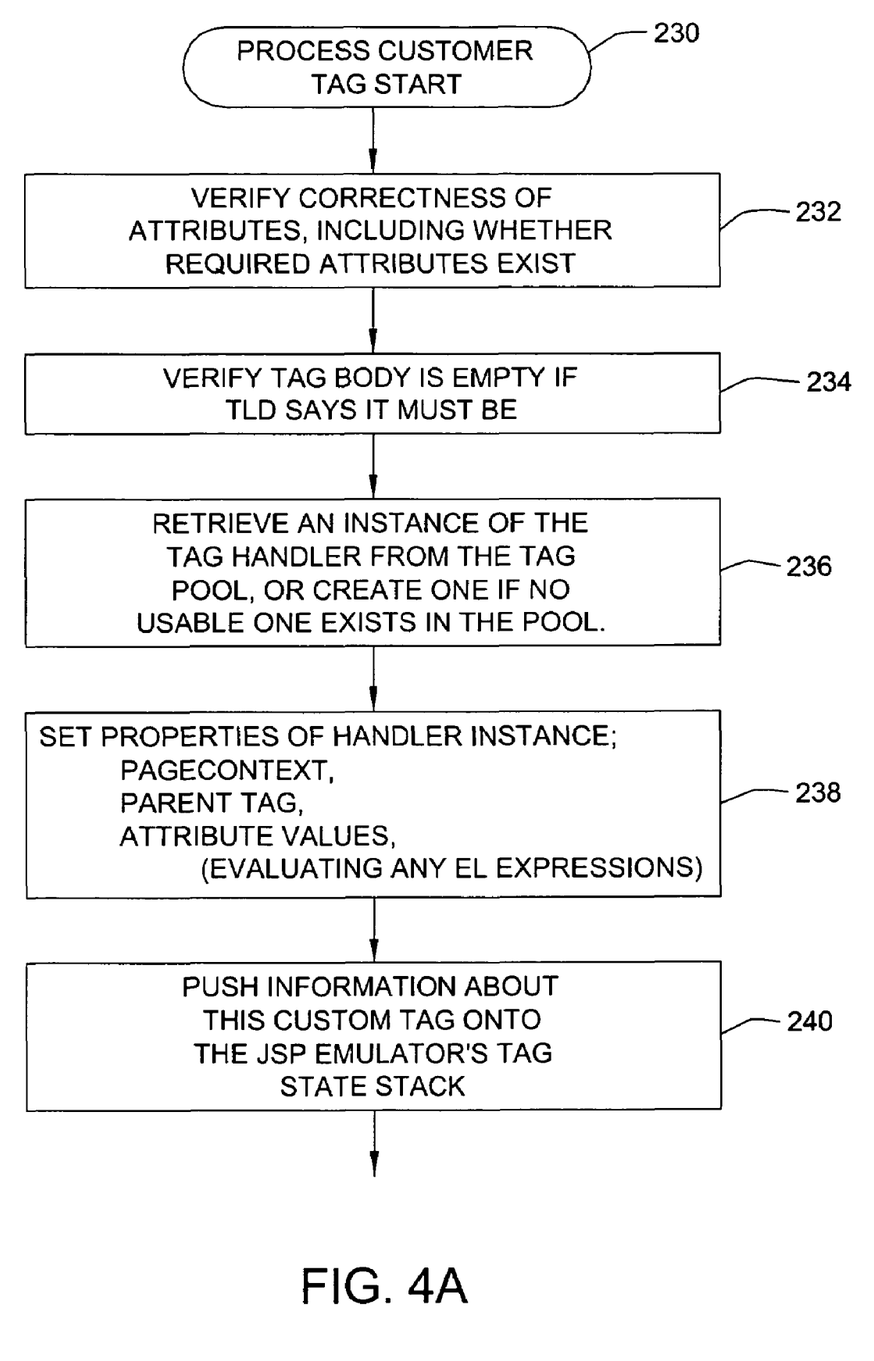
FIGS. 4A and 4B are a flow chart representation of the process custom tag start method called from step 216 of FIG. 3.
Figure 4B:
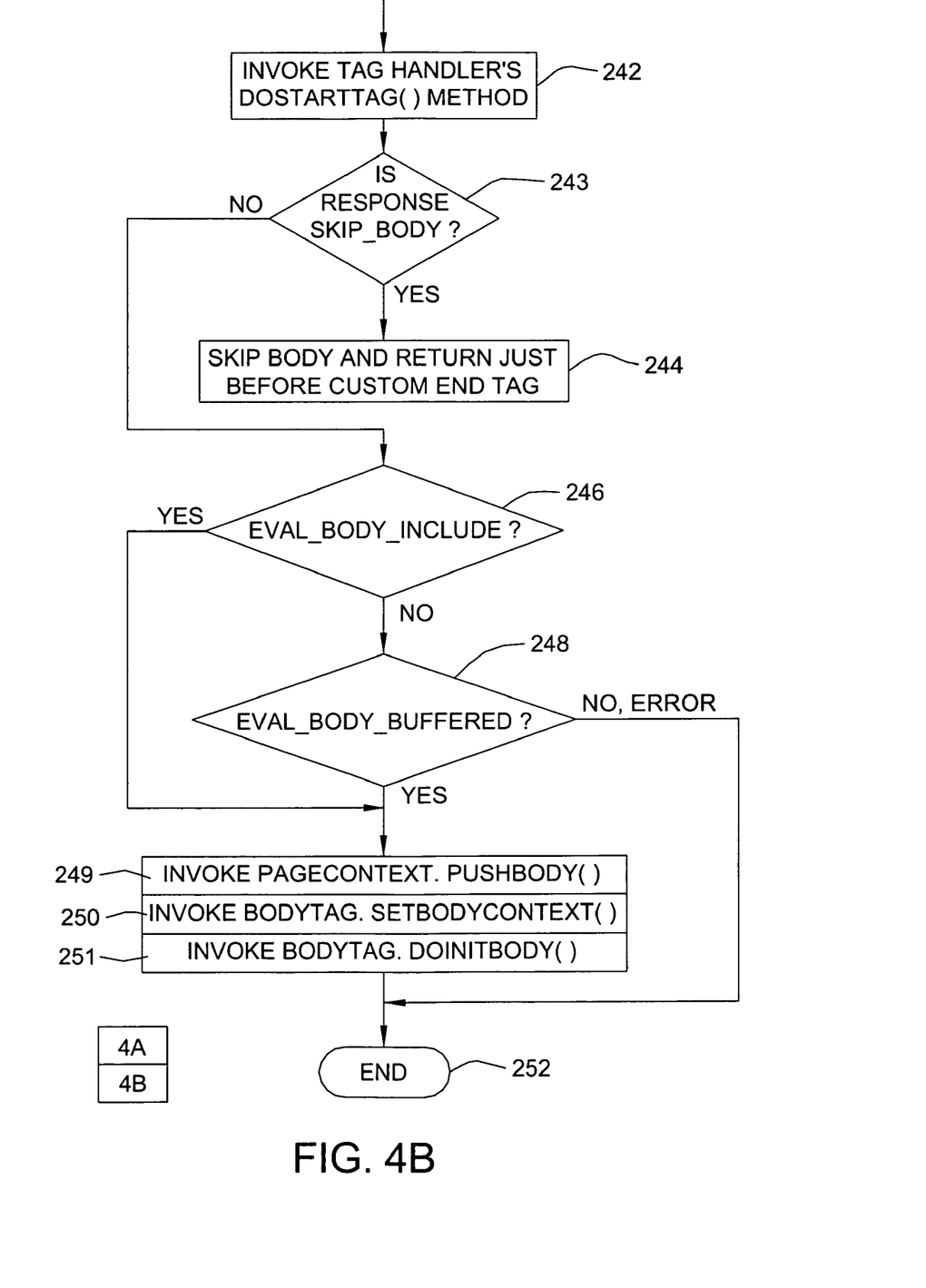

If this element 304 is a tag start 214, then in step 216 JSP emulator 100 calls custom tag start 322 which executes the process of FIGS. 4A and 4B.

Figure 5A:
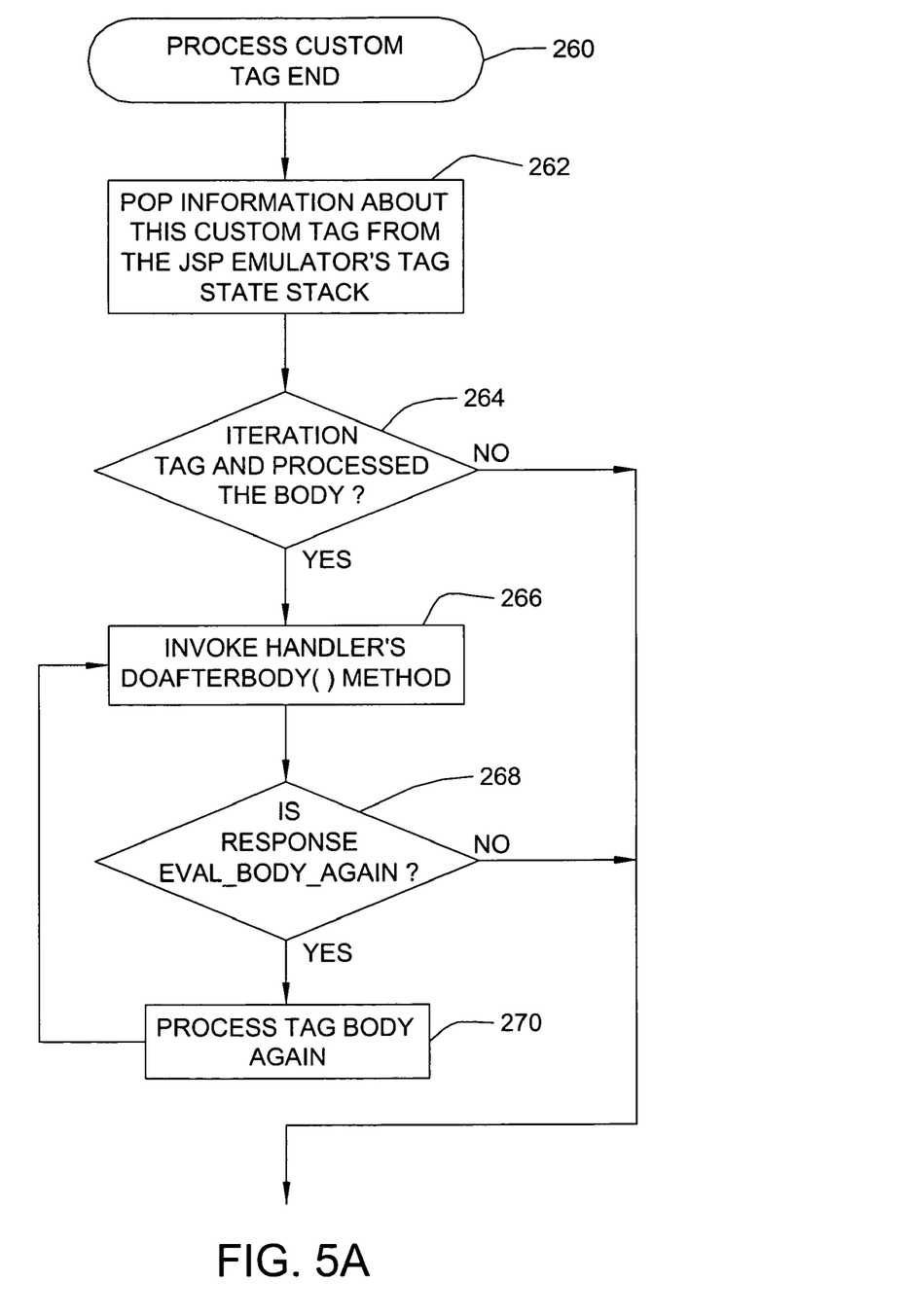
FIGS. 5A and 5B are a flow chart representation of the process custom tag end method called from step 220 of FIG. 3.
Figure 5B:
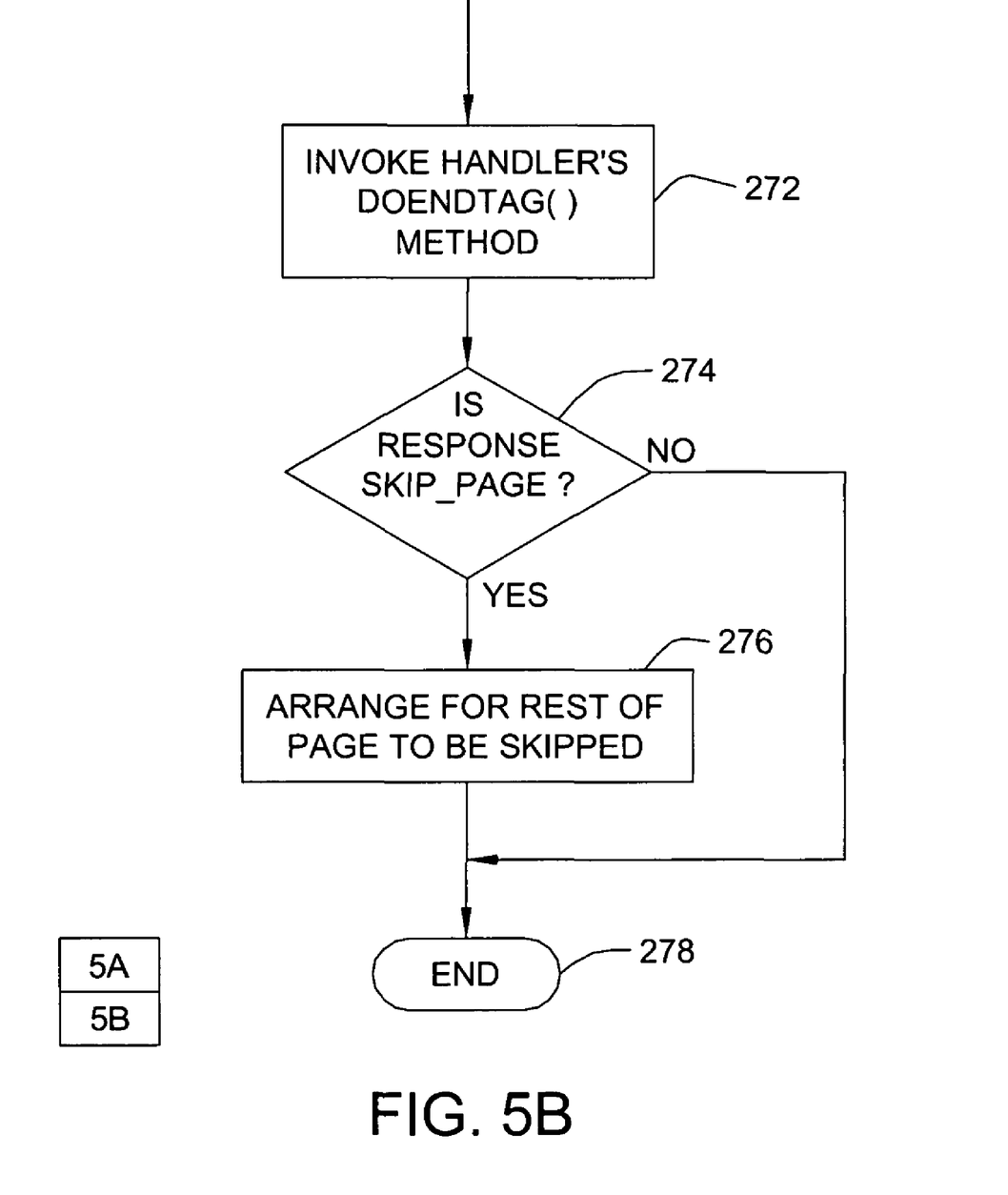

If this element 304 is a tag end 218, then in step 220 JSP emulator 100 calls custom tag end method 324 which executes the process of FIGS. 5A and 5B.

If this element 304 is an EL expression 222, then in step 224, a method evaluate EL expression 326 is called and the result written to the output stream (that is, final markup 112).

If this element 304 is none of elements 210, 214, 218, and 222, then in step 226 JSP emulator 100 ends. Thus, emulator 100 finished processing page 102 when there are no more elements in the tree 302. Any syntax that isn't specifically recognized is assumed to be template text 210.

Referring to FIGS. 4A and 4B, custom tag start method 322, called from step 212, starts at step 230, with input including page context 350, and parent tag and attribute values. In step 232, JSP emulator 100 verifies the correctness of the attributes, including whether required attributes exist.

In step 234 JSP emulator 100 determines if the tag body 314 is empty, if TLD 300 indicates that it must be. That is, TLD 300 indicates whether a certain tag is permitted to contain a body.

In step 236, JSP emulator 100 retrieves an instance of a tag handler 332 from tag pool 330, or creates one if no usable one exists in pool 330. (Tag pool 330 would have been set up by JSP emulator during initialization, or start step 200.)

In step 238, JSP emulator 100 sets the properties of handler instance 332, including page context 350, parent tag 352, and attribute values 354 (the latter, by evaluating any EL expressions 222 setting these values 354).

In step 240, information about this custom tag 104 is pushed by JSP emulator 100 onto tag state stack 360. A tag library 104 contains implementations of custom tags. A JSP element 304 contains references to, or "invocations" of particular tags 104. This step 240 remembers on stack 360 of such invocations information about this particular invocation of this particular tag. Since the body of one invocation may contain invocations of other, or even the same, tags 104, such nesting is possible. The information remembered includes the reference to this tag 104, a reference 352 to any parent tag 104 in which this tag is nested, specified attribute names and values 354, whether the tag body 314 is empty or not, and so forth.

In step 242, JSP emulator 100 invokes a DoStartTag( ) method of tag handler instance 332. DoStartTag( ) method will return a response of Skip_Body 243, Eval_Body_Include 246, or Eval_Body_Buffered 248.

If the response from DoStartTag( ) method 242 is Skip_Body 243, in step 244 tag start method 322 skips body 314 and returns processing to JSP emulator 100 just before custom tag end 310.

In steps 246 and 248, if the response from DoStartTag( ) method 334 is Eval_Body_Include 246, or Eval_Body_Buffered 248, respectively, DoStartTag( ) method 322 invokes PageContext.PushBody( ) 249, BodyTag.SetBodyContent( ) 250, and BodyTag.DoInitBody( ) 251, and in step 252 ends, returning control to JSP emulator 100 at step 208. In the event that the response from DoStartTag( ) 334 is none of responses 243, 246, or 248, an error condition is flagged and tag start method 322 ends 252.

Skip_Body 243, Eval_Body_Include 246, and Eval_Body_Buffered 248 are possible return values from the doStartTag( ) method call. The custom tag's implementation of doStartTag( ) (step 242) returns a value that controls subsequent processing, and can indicate that the body should be skipped, processed normally, or provided as bulk data to the tag implementation.

Referring to FIGS. 5A and 5B, in connection with FIG. 2, process custom tag end method 324, called from step 220, starts in step 260. In step 262, information about this custom tag is popped from tag state stack 360 of JSP emulator 100.

In step 264 JSP emulator 100 determines if this tag is an iteration tag and that body 314 has been processed. If not processing continues at step 272. If so, in step 266 JSP emulator 100 invokes DoAfterBody( ) method. The doAfterBody( ) method is implemented by a custom tag handler 332. It is called when the JSP container has finished processing the body. In this method, the handler can do whatever it wants to at that point. In the case of iteration tags, it also indicates with a return value whether or not the JSP container should loop and process the body again.

In step 268, JSP emulator 100 determines if the response is Eval_Body_Again, and if so, in step 270 processes the tag body another iteration by returning to step 266. If not, processing continues to step 272.

In step 272, JSP emulator 100 invokes its DoEndTag( ) method. DoEndTag( ) is also implemented by a custom tag handler 332, and is called when JSP container 100 is processing the end tag 218. In this method, handler 332 can do whatever it wants. It typically writes something to output stream 112. It also indicates, via a return value, whether the JSP container 100 should continue and process more tags, or stop immediately. All of these methods are described in "JavaServer Pages™ Specification", Version 2.0. Sun Microsystems, Copyright 2003.

In step 274, JSP emulator 100 determines if the response is Skip_page. If so, in step 276, JSP emulator 100 arranges for the rest of the page to be skipped, and ends in step 278, returning control to step 208 to process the next JSP element 304 if one still exists in tree 302.

The result of processing FIG. 3 is final markup, or output stream, 112. This output is text that is typically sent to a browser as a response to a web request made by the browser.

Advantages over the Prior Art

It is an advantage of the invention that there is provided a system and method for emulating the processing of Java server pages.

Alternative Embodiments

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Figure 6:
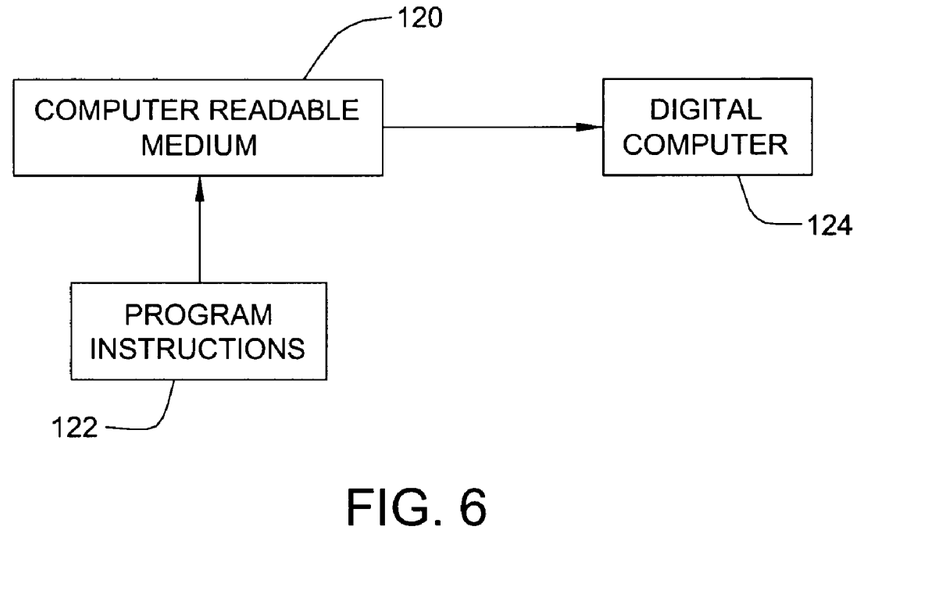
FIG. 6 is a high level system diagram of a computer program product for implementing the preferred embodiment of the invention.

Referring to FIG. 6, furthermore, the invention can take the form of a computer program product accessible from a computer-usable or computer-readable medium 120 providing program code 122 for use by or in connection with a computer 124 or any instruction execution system. For the purposes of this description, a computer-usable or computer-readable medium 120 can be any apparatus that can contain, store, communicate, propagate, or transport the program for use by or in connection with the instruction execution system, apparatus, or device 124.

The medium 120 can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor 124 coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Accordingly, the scope of protection of this invention is limited only by the following claims and their equivalents.

I claim:

1. A method for emulating the processing of server pages, comprising:
   reading a server page, including identifying any calls to a library of custom tags;
   emulating any calls to custom tags identified in said server page, wherein said server page is generated and processed dynamically at runtime;
   discovering and parsing a tag language definition (TLD) file for this server context;
   parsing said server page to create a tree of nodes for each element of said tree;
   creating and initializing a page context object;
   sequentially processing said tree to identify each said node as one of template text, custom tag start, custom tag end, and expression language (EL) expression;
   responsive to this node being template text, writing said text directly to final markup;
   responsive to this node being a custom tag start, processing a custom tag start method including:
      verifying correctness of attributes, including whether required attributes exist;
      verifying tag body is empty if required to be so by said TLD file;
      setting properties of a tag handler instance to include said page context, any parent tag, and any attribute values determined from evaluating any EL expressions;
      pushing information about this custom tag onto a tag state stack;
      receiving from said custom tag start method a response code, said response code being one of skip body, evaluate body include, and evaluate body buffered;
      responsive to said response code being skip body, skipping body;
      responsive to said response code being one of evaluate body include and evaluate body buffered, invoking methods for page context push body, body tag set body content, and body tag do initiate body;
   responsive to this node being a tag end, processing a custom tag end method including:
      determining if this custom tag is an iteration and that said body has been processed, and if not invoking a do end tag method;
      responsive to this custom tag not being an iteration with said body processed, invoking a do after body method to process each remaining iteration and thereafter invoking said do end tag method;

responsive to a skip page response from said do end tag method, arranging for remainder of this page to be skipped; and responsive to this node being an EL expression, evaluating said EL expression and writing result to said final markup.

2. The method of claim 1, further comprising:
said calls selectively including start tag, invoke page context push body, invoke body tag set body content, invoke body tag do initiate body, do after body, and do end tag.

3. The method of claim 1, said final markup including template text, custom tag evaluations, and EL expressions processed into plain text.

4. The method of claim 2, further comprising:
said calls selectively including Java dostarttag( ) invoke pagecontext.pushbody( ) invoke bodytag.setbodycontent( ), invoke bodytag.doinitbody( ) doafterbody( ) and doendtag( )methods.

5. The method of claim 1, said server page being a Java server page (JSP), and further comprising:
while parsing said server page, writing any text determined to be template text directly to final markup.

6. A data processing system for executing a method to emulate at run time the processing of server pages, the system comprising:
a processor coupled to memory elements;
a library of custom tags;
a server page emulator;
said server page emulator for reading a server page, including identifying any calls to said library of custom tags;
said server page emulator further for emulating any calls to said custom tags identified in said server page, wherein said server page is generated and processed dynamically at runtime;
a tag language definition (TLD) file;
said server page emulator further for discovering and parsing the tag language definition (TLD) file for this server context;
said server page emulator further for parsing said server page to create a tree of nodes for each element of said tree;
said server page emulator further for creating and initializing a page context object;
said server page emulator further for sequentially processing said tree to identify each said node as one of template text, custom tag start, custom tag end, and expression language (EL) expression;
said server page emulator further, responsive to this node being template text, for writing said text directly to final markup;
said server page emulator further, responsive to this node being a custom tag start, for processing a custom tag start method including:
verifying correctness of attributes, including whether required attributes exist;
verifying tag body is empty if required to be so by said TLD file;
setting properties of a tag handler instance to include said page context, any parent tag, and any attribute values determined from evaluating any EL expressions;
pushing information about this custom tag onto a tag state stack;

receiving from said custom tag start method a response code, said response code being one of skip body, evaluate body include, and evaluate body buffered;

responsive to said response code being skip body, skipping body;

responsive to said response code being one of evaluate body include and evaluate body buffered, invoking methods for page context push body, body tag set body content, and body tag do initiate body;

said server page emulator further, responsive to this node being a tag end, for processing a custom tag end method including:
determining if this custom tag is an iteration and that said body has been processed, and if not invoking a do end tag method;
responsive to this custom tag not being an iteration with said body processed, invoking a do after body method to process each remaining iteration and thereafter invoking said do end tag method;
responsive to a skip page response from said do end tag method, arranging for remainder of this page to be skipped; and said server page emulator further, responsive to this node being an EL expression, for evaluating said EL expression and writing result to said final markup.

7. The system of claim 6, further comprising:
said calls selectively including start tag, invoke page context push body, invoke body tag set body content, invoke body tag do initiate body, do after body, and do end tag.

8. The system of claim 6, said final markup including template text, custom tag evaluations, and EL expressions processed into plain text.

9. The system of claim 7, further comprising:
said calls selectively including Java dostarttag( ) invoke pagecontext.pushbody( ) invoke bodytag.setbodycontent( ) invoke bodytag.doinitbody( ) doafterbody( ) and doendtag( )methods.

10. The system of claim 6, said server page being a Java server page (JSP), and further comprising:
said server page emulator further, while parsing said server page, for writing any text determined to be template text directly to final markup.

11. A computer program product for emulating the processing of server pages, the computer program product comprising:
a non-transitory computer readable storage medium having computer readable program code embodied therewith, the computer readable program code comprising:
first program instructions for reading a server page, including identifying any calls to a library of custom tags;
second program instructions for emulating any calls to custom tags identified in said server page, wherein said server page is generated and processed dynamically at runtime;
third program instructions for discovering and parsing a tag language definition (TLD) file for this server context;
fourth program instructions for parsing said server page to create a tree of nodes for each element of said tree;
fifth program instructions for creating and initializing a page context object
sixth program instructions for sequentially processing said tree to identify each said node as one of template text, custom tag start, custom tag end, and expression language (EL) expression;

seventh program instructions, responsive to this node being template text, for writing said text directly to final markup;

eighth program instructions, responsive to this node being a custom tag start, for processing a custom tag start method including:
- verifying correctness of attributes, including whether required attributes exist;
- verifying tag body is empty if required to be so by said TLD file;
- setting properties of a tag handler instance to include said page context, any parent tag, and any attribute values determined from evaluating any EL expressions;
- pushing information about this custom tag onto a tag state stack;
- receiving from said custom tag start method a response code, said response code being one of skip body, evaluate body include, and evaluate body buffered;
- responsive to said response code being skip body, skipping body;
- responsive to said response code being one of evaluate body include and evaluate body buffered, invoking methods for page context push body, body tag set body content, and body tag do initiate body;

ninth program instructions, responsive to this node being a tag end, for processing a custom tag end method including:
- determining if this custom tag is an iteration and that said body has been processed, and if not invoking a do end tag method;
- responsive to this custom tag not being an iteration with said body processed, invoking a do after body method to process each remaining iteration and thereafter invoking said do end tag method;
- responsive to a skip page response from said do end tag method, arranging for remainder of this page to be skipped;

tenth program instructions, responsive to this node being an EL expression, for evaluating said EL expression and writing result to said final markup; and wherein said first, second, third, fourth, fifth, sixth, seventh, eighth, ninth, and tenth program instructions are recorded on said computer readable medium.

12. The computer program product of claim 11, further comprising:
said calls selectively including start tag, invoke page context push body, invoke body tag set body content, invoke body tag do initiate body, do after body, and do end tag.

13. The computer program product of claim 11, said final markup including template text, custom tag evaluations, and EL expressions processed into plain text.

14. The computer program product of claim 12, further comprising:
said calls selectively including Java dostarttag( ) invoke pagecontext.pushbody( ), invoke bodytag.setbodycontent( ) invoke bodytag.doinitbody( ), doafterbody( ), and doendtag( )methods.

15. The computer program product of claim 11, said server page being a Java server page (JSP), and further comprising:
eleventh program instructions for writing any text determined to be template text while parsing said server page directly to final markup; and wherein
said eleventh program instructions are recorded on said computer readable medium.

16. A method for emulating the processing of server pages, comprising:
- reading a server page, including identifying any calls to a library of custom tags;
- emulating any calls to custom tags identified in said server page, wherein said server page is generated and processed dynamically at runtime;
- parsing each said server page to create a tree of nodes for each element of said server page;
- identifying each said node as one of template text, custom tag start, custom tag end, and expression language (EL) expression;
- for each template text node, writing text directly to final markup;
- for each custom tag start and custom tag end node pair, selectively skipping, processing normally, and providing as bulk data to tag implementation; and
- for each EL expression node, evaluating said EL expression and writing result to final markup.

* * * * *